United States Patent
Speth et al.

(10) Patent No.: US 7,526,262 B2
(45) Date of Patent: Apr. 28, 2009

(54) CONVERTER CIRCUIT FOR A LIMITER RECEIVER STRUCTURE AND METHOD FOR CONVERTING A SIGNAL IN A LIMITER RECEIVER STRUCTURE

(75) Inventors: Michael Speth, Krefeld (DE); Britta Felbecker, München (DE); Markus Hammes, Dinslaken (DE)

(73) Assignee: Infineon Technologies AG, Munich (DE)

( * ) Notice: Subject to any disclaimer, the term of this patent is extended or adjusted under 35 U.S.C. 154(b) by 700 days.

(21) Appl. No.: 11/179,449

(22) Filed: Jul. 12, 2005

(65) Prior Publication Data

US 2006/0046675 A1    Mar. 2, 2006

Related U.S. Application Data

(63) Continuation of application No. PCT/DE03/04278, filed on Dec. 23, 2003.

(30) Foreign Application Priority Data

Jan. 13, 2003    (DE) .................. 103 00 938

(51) Int. Cl.
G06F 3/033    (2006.01)
(52) U.S. Cl. .................. 455/130; 455/205; 455/337
(58) Field of Classification Search .......... 455/130, 455/205, 210, 165.1, 183.1, 260, 323, 131, 455/189.1, 207, 311, 313, 334, 337
See application file for complete search history.

(56) References Cited

U.S. PATENT DOCUMENTS

| | | | | |
|---|---|---|---|---|
| 3,902,123 | A | * | 8/1975 | Oomen .................. 455/221 |
| 3,983,488 | A | * | 9/1976 | Bush et al. .................. 455/208 |
| 4,379,284 | A | * | 4/1983 | Boykin .................. 375/329 |
| 5,329,242 | A |   | 7/1994 | Myers |
| 5,436,589 | A | * | 7/1995 | La Rosa et al. .............. 329/302 |
| 5,555,451 | A | * | 9/1996 | Kennedy et al. ......... 455/161.2 |
| 5,724,396 | A |   | 3/1998 | Claydon et al. |
| 5,910,752 | A |   | 6/1999 | Filipovic et al. |
| 2005/0191983 | A1 | * | 9/2005 | Komer .................. 455/280 |

FOREIGN PATENT DOCUMENTS

DE    101 03 479 A1    8/2002

OTHER PUBLICATIONS

"Low-Power Design of a Digital FM Demodulator Based on Zero-Cross Detection at IF", N. Ismailoglu and T. Yalcin, IEEE Vehicular Technology Conference, Sep. 19-22, 1999, pp. 810-813.
International Search Report, Int'l Application No. PCT/DE03/04278, Int'l Filing Date Dec. 23, 2003, 3 pgs.

* cited by examiner

*Primary Examiner*—Sonny Trinh
(74) *Attorney, Agent, or Firm*—Eschweiler & Associates, LLC

(57) ABSTRACT

The present invention relates generally to a converter circuit with a limiter to convert an analog reception signal into a value-discrete limiter signal. An evaluation circuit determines a zero crossing distance signal from the temporal distances between successive zero crossings of the limiter signal. A synthesis circuit calculates a digital processing signal whose zero crossings correspond to those of the limiter signal and whose pulse shape has a smaller spectral width than a rectangular pulse.

14 Claims, 3 Drawing Sheets

CONVERTER CIRCUIT FOR A LIMITER RECEIVER STRUCTURE AND METHOD FOR CONVERTING A SIGNAL IN A LIMITER RECEIVER STRUCTURE

REFERENCE TO RELATED APPLICATIONS

This application is a continuation of PCT/DE03/04278, filed on Dec. 23, 2003, which was not published in English, which claims the benefit of the priority date of German Patent Application No. DE 103 00 938.8, filed on Jan. 13, 2003, the contents of which both are herein incorporated by reference in their entireties.

FIELD OF THE INVENTION

The invention relates to a converter circuit for processing an analog frequency- or phase-modulated reception signal for a limiter receiver structure and a method for the signal conversion of an analog frequency- or phase-modulated reception signal in a limiter receiver structure.

BACKGROUND OF THE INVENTION

So-called limiter receiver structures are used for outlay-favorable implementation of receivers for frequency- or phase-modulated signals with a constant envelope such as, for example, GFSK (Gaussian Frequency Shift Keying) signals. The functional principle of a limiter receiver structure is based on the fact that the essential portion of the information of a frequency- or phase-modulated signal lies in the frequency or the phase and thus in the zero crossings of the signal. The analog-to-digital conversion of the reception signal is effected in a limiter receiver structure by means of a threshold value decision (which is performed by the limiter) and a subsequent sampling of the value-discrete time-continuous rectangular signal output by the limiter. Since the entire useful information of the signal lies in the zero crossings in the signal path downstream of the limiter, a high sampling rate $T_z^{-1}$ is necessary in order to detect the zero crossings with the necessary accuracy. In order to avoid, during the sampling, spectral overlaps (aliasing) of higher harmonic spectral components and thus extinction of information, the sampling rate $T_z^{-1}$ has to be chosen to be significantly greater than the bandwidth B of the signal received by the limiter. In other words, the minimum sampling rate required from the standpoint of information theory (said rate being determined by the bandwidth B of the signal received by the limiter) is considerably lower than the sampling rate $T_z^{-1}$ used.

Afterward, from the digital signal generated by the sampling, by means of a plurality of filter stages, the higher harmonic components of the signal are eliminated, the signal rate is decimated, and a digital signal equivalent to the GFSK signal is generated by means of a demodulation. The elimination of the higher harmonic components of the signal has to be effected with the high sampling rate $T_z^{-1}$ and makes high requirements of the filters used in the signal path downstream of the sampling. In practice, complicated filter cascades with interposed decimation stages will be used for the signal reconstruction. A high-power consumption occurs on account of the high sampling rate $T_z^{-1}$.

The article "Low-Power Design of a Digital FM Demodulator Based on Zero-Cross Detection at IF", N. Ismailoglu et al., IEEE Vehicular Technology Conference, Sep. 19-22, 1999, pages 810 to 813, discloses a limiter discriminator circuit in which a digital zero crossing detector is arranged in the signal path downstream of the sampling. The zero crossing detector generates a signal specifying the instants of the zero crossings of the signal output by the limiter through generation of a logic "1". For demodulation of the signal output by the zero crossing detector, use is made of a fourth-order sinc cube decimation filter and a subsequent lowering of the sampling rate by the factor 4.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is based on the object of providing a converter circuit for processing an analog frequency- or phase-modulated reception signal for a limiter receiver structure which enables a demodulation of the converted signal using simpler filter structures. Furthermore, the invention aims to specify a method for processing an analog frequency- or phase-modulated reception signal in a limiter receiver structure by means of which it is possible to generate a processing signal that can be demodulated expediently in respect of complexity. In particular, the intention is, moreover, to be able to obtain a low power consumption in the converter circuit and subsequent circuit sections (demodulator).

The converter circuit according to the invention comprises a limiter, wherein the limiter converts an analog reception signal into a time-continuous, value-discrete limiter signal comprising a sequence of rectangular pulses. An evaluation circuit is coupled to the limiter, wherein the evaluation circuit detects the temporal distances between in each case two successive zero crossings of the limiter signal and outputs a zero crossing distance signal. Furthermore, the converter circuit comprises a signal synthesis circuit, which receives the zero cross distance signal and, in a manner dependent on the latter, generates a value- and time-discrete processing signal for the signal demodulation whose zero crossings correspond to the zero crossings of the limiter signal and whose pulse shape used for the signal synthesis has a smaller spectral width than a rectangular pulse of corresponding width.

In one advantageous embodiment of the present invention, what is achieved by means of the signal synthesis circuit is that, instead of the rectangular pulses implicitly predetermined by the limiter for the signal processing coupled to the converter circuit, use is made of pulses with a signal shape which have a smaller spectral width than rectangular pulses. On account of the better spectral characteristic, the requirements made of the filter units and thus also the complexity thereof decrease.

In one embodiment of the present invention, the pulse shape used in the signal synthesis may be chosen optimally in accordance with the post-processing that follows in the signal path coupled to the converter circuit. However, a particular refinement of the invention is characterized in that the signal synthesis circuit uses a triangular pulse as pulse shape. A triangular pulse has a substantially better spectral characteristic than a rectangular pulse, so that this choice makes it possible to obtain a large gain in complexity in the subsequent units (filters). A further advantage of using a triangular pulse is that the signal values of the triangular pulse can be calculated by means of simple linear operations.

A further advantageous refinement of the invention is characterized in that the temporal distances between in each case two successive zero crossings of the limiter signal are detected with a time accuracy $T_z$, and in that the processing signal has a sampling rate $T_s^{-1}$ that is less than $T_z^{-1}$. This permits the baseband signal processing (filtering including demodulation) to be performed with a significantly lower sample rate $T_s^{-1}$ even within the converter circuit (for example, after the determination of the zero crossings) and also downstream of the converter circuit). A significant reduction of the power consumption is achieved by means of this measure.

A further advantageous refinement of the invention is characterized in that the evaluation circuit comprises a zero crossing detector and a counter coupled to the zero crossing detector. In this case, only the counter has to be operated with the (high) sampling rate or clock frequency $T_z^{-1}$. The pulse generation in the signal synthesis circuit can already be effected in energy-saving fashion on the time base given by the reduced sampling rate $T_s^{-1}$. For this purpose, the signal synthesis circuit preferably comprises an interpolator which, in a manner dependent on the zero crossing distance signal synthesizes the processing signal at the support points determined by the sampling rate $T_s^{-1}$ using the predetermined pulse shape.

To the accomplishment of the foregoing and related ends, the invention comprises the features hereinafter fully described and particularly pointed out in the claims. The following description and annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in more detail in the following text with reference to a number of drawing figures, in which.

DETAILED DESCRIPTION OF THE INVENTION

Figure 1:
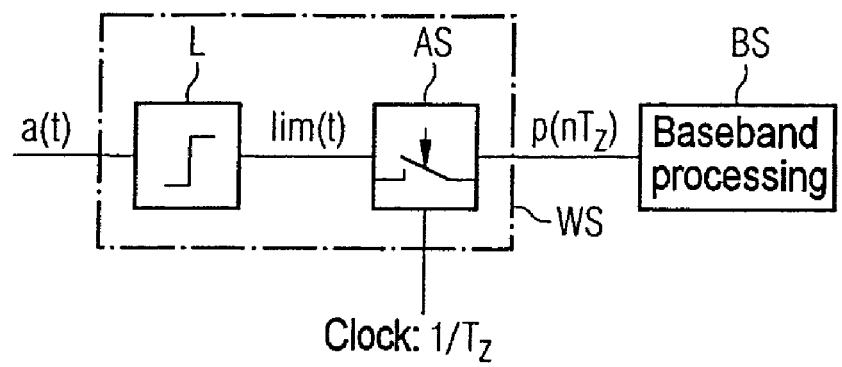
FIG. 1 is a converter circuit with a limiter in accordance with the prior art.

FIG. 1 shows a converter circuit WS for the analog-digital conversion of frequency- or phase-modulated signals in a limiter receiver structure according to the prior art. The converter circuit WS comprises a limiter L, the output of which is connected to the input of a sampling stage AS. The sampling stage AS is operated with a sampling frequency $T_z^{-1}$. The output signal of the sampling stage AS is fed to a baseband processing circuit BS which carries out a filtering and signal demodulation.

Figure 3A:
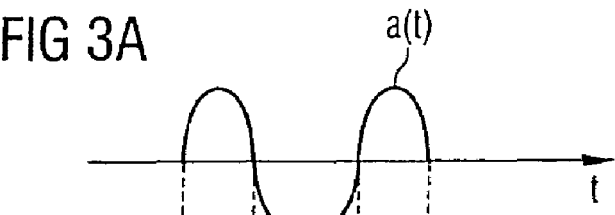
FIG. 3a is an illustration of the signal profile of an input signal for the converter circuit according to the invention.

The functioning of the circuit illustrated in FIG. 1 is as follows:

The limiter L carries out a threshold value decision of the analog reception signal a(t). A section of the temporal profile of the analog reception signal a(t) is illustrated in FIG. 3a. The analog reception signal a(t) is a sinusoidal signal having a varying period length on account of the frequency or phase modulation. If, for example, a two-value (binary) modulation alphabet is used at the transmitter end, the modulated reception signal a(t) has two different period lengths.

The limiter L performs a threshold value decision. The output signal lim(t) of the limiter L is determined as follows:

$\lim(t)=-1$ if $a(t)<0$ $\lim(t)=+1$ if $a(t)>0$.

The output signal lim(t) of the limiter L, comprising a sequence of rectangular pulses, is sampled by the sampling stage AS with a sampling rate $T_z^{-1}$. The sampling time $T_z$ determines the time resolution for determining the zero crossing of lim(t). On account of the poor spectral properties of rectangular pulses, $T_z^{-1}$ must be substantially greater than the bandwidth B of the signal a(t).

The digital signal output by the sampling stage AS is designated by $p(nT_z)$. In this case $nT_z$ specifies the discrete time in units n of the sampling time duration $T_z$. The digital signal $p(nT_z)$ is forwarded to the baseband processing circuit BS, in which, as known in the prior art, the higher harmonic components of the signal are eliminated by filtering and a demodulated signal is generated.

Figure 2:
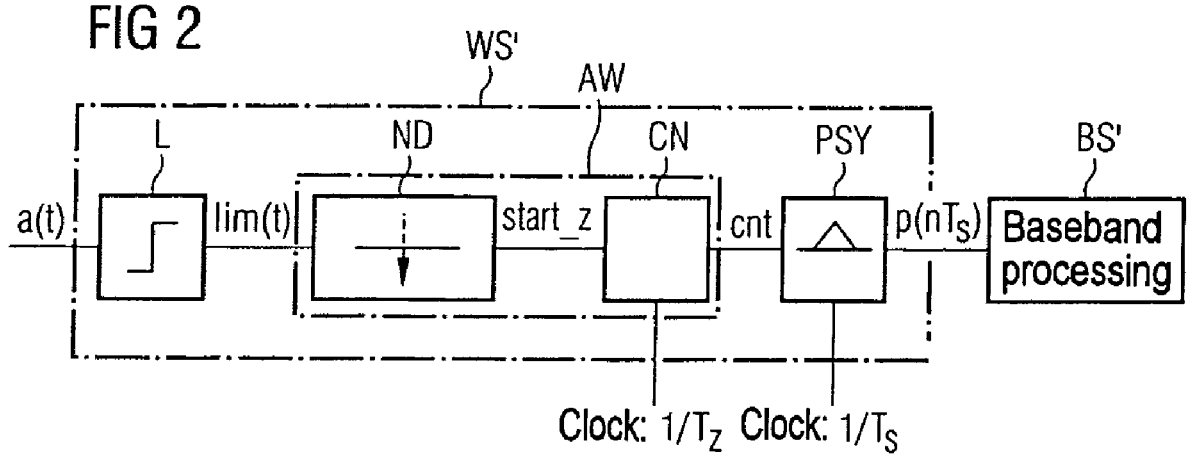
FIG. 2 is a converter circuit with a limiter according to the invention.

FIG. 2 shows a limiter receiver structure with a converter circuit WS' according to the invention.

The converter circuit WS' has a limiter L, a zero cross detector ND connected downstream of the limiter L, a counter CN connected downstream of the zero crossing detector ND, and a pulse synthesis stage PSY connected downstream of the counter CN. The output of the pulse synthesis stage PSY is forwarded to a baseband processing circuit BS'. The zero crossing detector ND and the counter CN form an evaluation circuit AW.

Figure 3B:
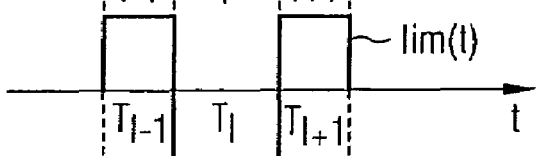
FIG. 3b is an illustration of the signal profile of a time-continuous, value-discrete signal output by the limiter.
Figure 3C:
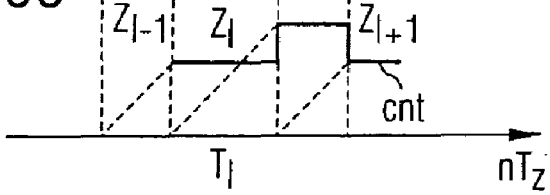
FIG. 3c is an illustration of the signal profile of a digital counting signal output by the counter.

In terms of construction and functioning, the limiter L is identical to the limiter L described with reference to FIG. 1. The signal lim(t) output by the limiter L is illustrated in FIG. 3b. The duration of the rectangular pulses corresponds to the respective zero crossing distances $T_{l-1}$, $T_l$, $T_{l+1}$ of the reception signal a(t). The zero crossings of the time-continuous, value-discrete output signal lim(t) of the limiter L are determined in the zero crossing detector ND. If a zero crossing is identified, then the zero crossing detector ND outputs a signal start_z. This zero crossing signal start_z starts the counter CN anew in each case. The counter CN is operated with the clock frequency or sampling rate $T_z^{-1}$. In each case upon the next activation by the signal start_z, the current counting result $Z_l$ (corresponding to the zero cross distance $T_l$) is present at the output of the counter CN until the end of the current counting period. The output signal cnt of the counter CN and also the current internal counter reading (dashed line) are illustrated in FIG. 3c. The time granularity required for measuring the zero crossing time distances is $T_z$ and is of the same order of magnitude as the sample frequency $T_z$ of the prior art circuit shown in FIG. 1.

As can be seen from FIGS. 3a to 3c, the magnitude of the (maximum) counts $Z_{l-1}$, $Z_l$, $Z_{l+1}$ corresponds to the time durations $T_{l-1}$, $T_l$, $T_{l+1}$ of the time intervals L−1, l and l+1 defined by zero crossings.

Figure 4:
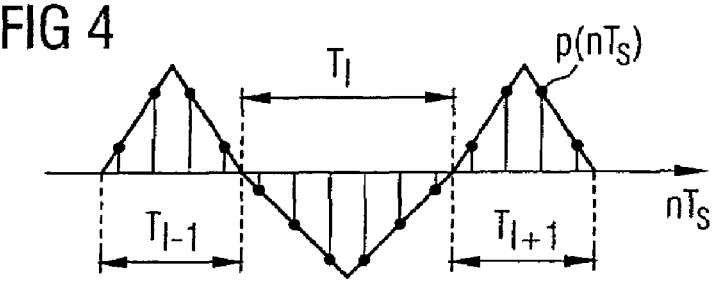
FIG. 4 is an illustration of the signal profile of a value- and time-discrete processing signal output by the converter circuit according to the invention.

On the basis of these zero crossing time distances $T_{l-1}$, $T_l$, $T_{l+1}$ determined with the time granularity $T_z$, the pulse synthesis stage PSY generates a digital processing signal $p(nT_s)$ from a basic pulse. By way of example, a triangular pulse may be used as the basic pulse, as illustrated in FIG. 4. The digital processing signal $p(nT_s)$ may be generated by means of an interpolator, which, in a manner dependent on the zero crossing time distances $T_{l-1}$, $T_l$, $T_{l+1}$ output by the counter CN in the form of the counters $Z_{l-1}$, $Z_l$, $Z_{l+1}$, calculates the processing signal at the support points determined by means of a time base $T_s$ using triangular pulses. The time base $T_s$ with respect to which the digital processing signal $p(nT_s)$ is generated may be chosen arbitrarily, in principle, a certain minimum time resolution (maximum sampling time duration $T_s$) having to be ensured on account of the requirements by the subsequent signal processing and also on account of requirements appertaining to signal theory (satisfying the sampling theorem).

It is pointed out that the time resolution $T_s$ is now no longer determined by the accuracy requirements of the zero crossings, but rather depends on the spectral properties of the pulse used for synthesis of the digital processing signal $p(nT_s)$ and also the subsequent baseband signal processing in the baseband processing stage BS'.

This makes it possible to perform the baseband processing in the baseband processing stage BS' at a significantly lower sampling rate $T_s^{-1}$ after the determination of the zero crossings with the time accuracy $T_z$. The requirements made of the complexity of the baseband processing stage BS' thus decrease.

It is furthermore pointed out that even the time-discrete processing signal $p(nT_s)$ is generated with the low processing rate $T_s$. That is to say that the individual basic pulses are not generated with a high sampling rate (e.g. $T_z^{-1}$) and decimated, rather they are calculated by means of interpolation directly on the minimum required time basis $T_s$. This is because the pulse synthesis stage PSY accepts the counts $Z_{l-1}, Z_l, s_{l+1}$ of the output signal cnt of the counter CN with its own (slow) clock $T_s$. Therefore, the pulse synthesis stage PSY can also be implemented with very low complexity.

Figure 5:
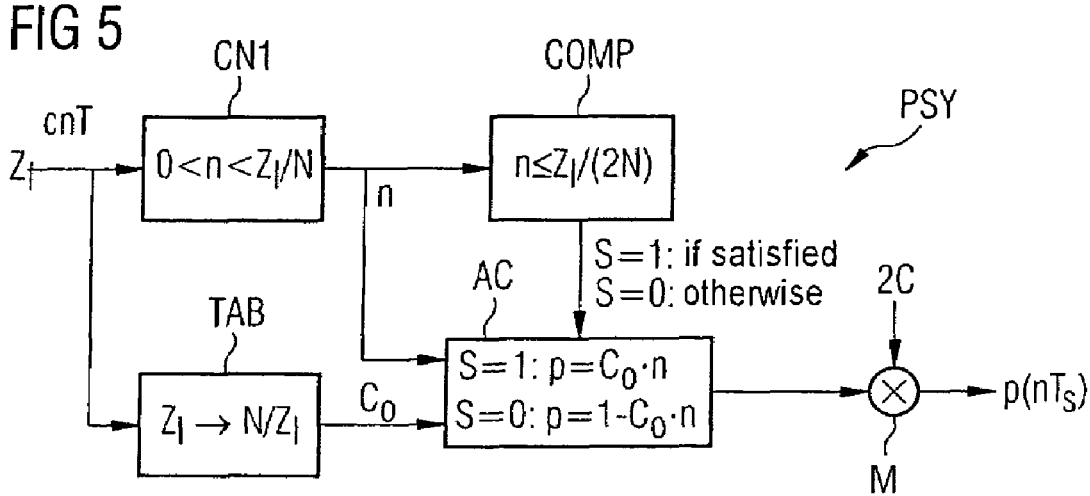
FIG. 5 is a circuit diagram of the pulse synthesis stage illustrated in FIG. 2.

FIG. 5 shows an implementation—favorable in respect of complexity—of the pulse synthesis stage PSY for generating triangular pulses with uniform maximum height C. The pulse synthesis stage PSY comprises a counter CN1, a comparator COMP connected downstream of the counter, a table store TAB, an accumulator AC and a multiplier M.

It is assumed that the count $Z_l$ is present as an integral multiple of the sample time Ts. The integral multiple N is defined by the equation $N=T_s/T_z$. The following relationship then results for the output values $p(nT_s)$ of the triangular pulse:

$$p(nT_s) = \begin{cases} 2C \cdot n \cdot N/Z_1 & \text{for } 0 < n < Z_1/(2N) \\ 2C - 2C \cdot n \cdot N/Z_1 & \text{for } Z_1/(2N) < n < Z_1/N \end{cases}$$

The counter CN1 generates the value n representing the discrete time. The comparator COMP checks whether $n<Z_l/(2N)$, i.e. whether the upper or the lower expression of the equation specified above has to be used for generating the signal values. The comparator COMP outputs a control signal S having the value S=1 if the inequality $n<Z_l/(2N)$ is satisfied. Otherwise, S=0 holds true.

The factor $N/Z_l$ is designated by $C_0$. Since only a finite number of factors $N/Z_l$ exist, these can be calculated in advance and stored in the table store TAB. The currently required value $C_0$ is read out from the table store TAB in a manner dependent on the counting result $Z_l$ and forwarded to the accumulator AC. At the system clock rate $T_s^{-1}$ of the pulse synthesis stage PSY, the accumulator AC calculates the expression $p=C_0 \cdot n$ for S=1 or the expression $p=1-C_0 \cdot n$ for S=0. The pulse shape is thus generated with the correct pulse length. The maximum amplitude C of the triangular pulse is determined by multiplication by the factor 2C. The multiplication is carried out by the multiplier M. C may be chosen in accordance with the requirements of the subsequent units (baseband processing BS').

Figure 6:
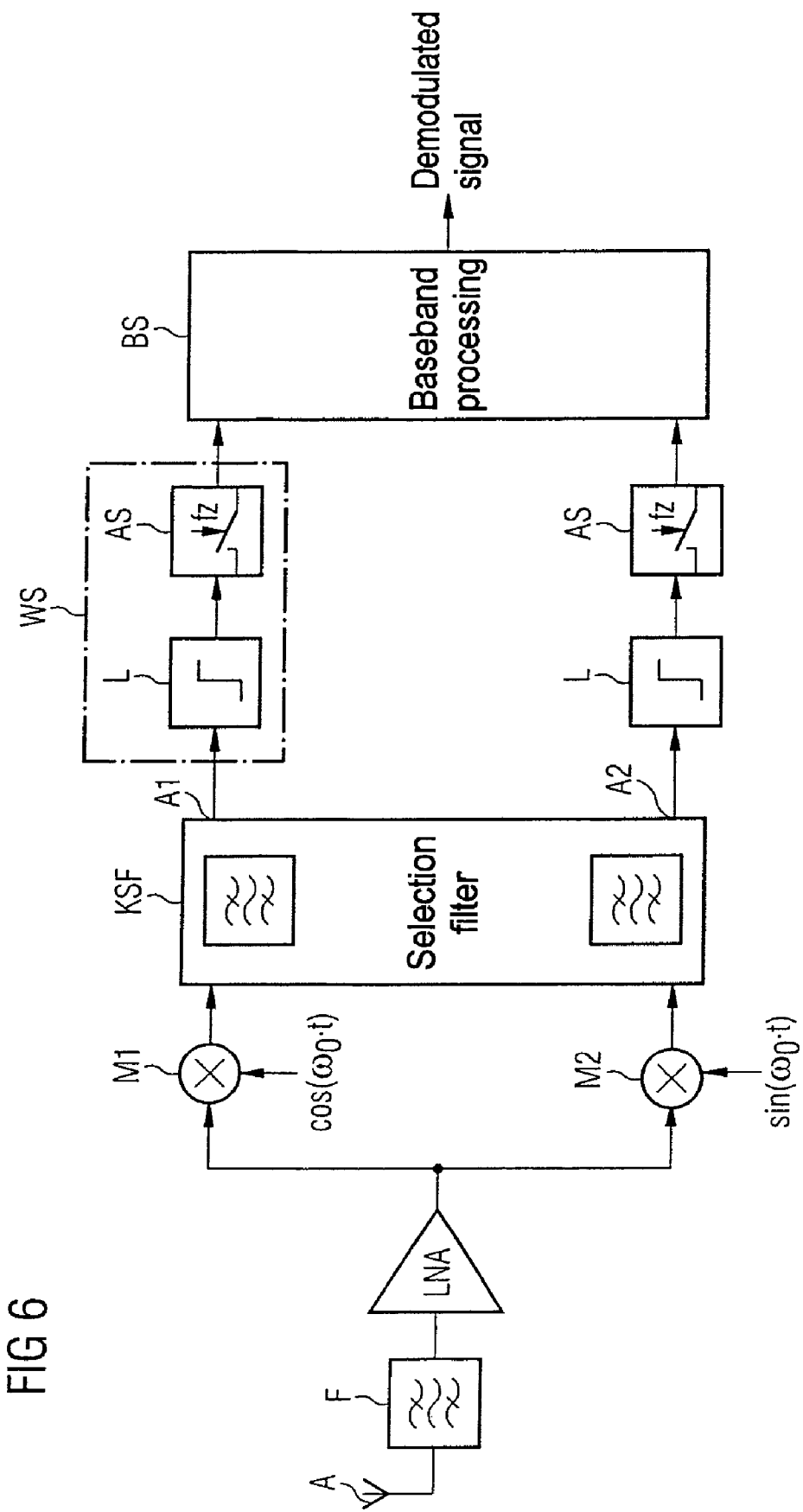
FIG. 6 is a circuit diagram of a radio receiver with a limiter receiver structure.

FIG. 6 shows, in an exemplary manner, the construction of a receiver circuit according to the limiter discriminator principle as disclosed for example in the German patent application DE 101 03 479 A1. The known converter circuit WS shown in FIG. 6 corresponds to the converter circuit WS illustrated in FIG. 1.

In accordance with FIG. 6, a radio signal is captured by an antenna A and fed via an input filter E to a low noise input amplifier LNA (Low Noise Amplifier). The input amplifier LNA amplifies the radiofrequency antenna signal with an adjustable gain. After the low noise amplification, the amplified signal is converted to an intermediate frequency. For this purpose, the output signal of the low noise amplifier LNA is fed to two mixers M1 and M2. The mixers M1 and M2 are operated in a known manner, with a phase offset of 90°, with a mixing frequency which is derived from a local oscillator (not illustrated). The two signals used for operating the mixers M1 and M2 correspond in their time dependence to $\cos(\omega_0 t)$ and $\sin(\omega_0 t)$, where $\omega_0$ designates the angular frequency assigned to the oscillator frequency and t designates the time.

Inphase (I) and quadrature (Q) signals in the intermediate frequency are available at the outputs of the mixers M1 and M2, respectively.

The outputs of the two mixers M1 and M2 are fed to an I and respectively a Q signal input of an analog channel selection filter KSF serving for image frequency suppression. By means of the channel selection filter KSF, a specific frequency channel is selected and the desired useful signal is thereby filtered out from the broadband signal-interference signal mixture present on the input side.

The two I and Q signal components are output with the bandwidth of the useful channel at two outputs A1, A2 of the channel selection filter KSF.

In the case of a receiver circuit according to the invention based on the limiter discriminator principle, the known converter circuit WS is replaced by the converter circuit WS' according to the invention as illustrated in FIG. 2. Furthermore, the simplified baseband processing circuit BS' is used instead of BS (illustrated in two-channel fashion in FIG. 6). The analog reception signal a(t) thus corresponds to the I signal component and the Q signal component at the outputs A1 and A2, respectively.

For the baseband processing/demodulation, it is possible, by way of example, to use the algorithm described in the document DE 101 03 479 A1, which is hereby incorporated by reference in the content of the present document.

While the invention has been illustrated and described with respect to one or more implementations, alterations and/or modifications may be made to the illustrated examples without de-parting from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A converter circuit for processing an analog reception signal for a limiter receiver structure, comprising:

a limiter configured to convert the analog reception signal into a time-continuous, value-discrete limiter signal characterized by a sequence of rectangular pulses;

an evaluation circuit coupled to the limiter, wherein the evaluation circuit detects the temporal distances between two successive zero crossings of the limiter signal and outputs a zero crossing distance signal in response to the detection of the temporal distances; and a signal synthesis circuit receiving the zero crossing distance signal and generating a value- and time-discrete processing signal, wherein the zero crossings of the processing signal correspond to the zero crossings of the limiter signal and the pulse shape used for the signal synthesis has a smaller spectral width than a rectangular pulse of corresponding width.

2. The converter circuit of claim 1, wherein the signal synthesis circuit uses a triangular shaped pulse.

3. The converter circuit of claim 1, wherein the evaluation circuit detects the temporal distances between each of two successive zero crossings of the limiter signal with a time accuracy, and wherein the processing signal has a sampling rate that is less than a clock frequency.

4. The converter circuit of claim 3, wherein the evaluation circuit comprises a zero crossing detector coupled to a counter.

5. The converter circuit of claim 1, wherein the signal synthesis circuit has an interpolator that synthesizes the processing signal at support points determined by the sampling rate using the predetermined pulse shape.

6. The converter circuit of claim 1, wherein the evaluation circuit detects the temporal distances between two successive zero crossings of the limiter signal with a time accuracy, and wherein the processing signal has a sampling rate that is less than a clock frequency.

7. The converter circuit of claim 6, wherein the evaluation circuit comprises a zero crossing detector coupled to a counter.

8. A method for converting an analog reception signal in a limiter receiver structure, the method comprising:

generating a limited, time-continuous, value-discrete limiter signal characterized by a sequence of rectangular pulses from an analog reception signal;

determining the temporal distances between two successive zero crossings of the limiter signal; and synthesizing a value- and time-discrete processing signal based on the temporal distances determined between successive zero crossings of the limiter signal, wherein the zero crossings of the processing signal correspond to the zero crossings of the limiter signal and the pulse shape used for the signal synthesis has a smaller spectral width than a rectangular pulse of corresponding width.

9. The method of claim 8, wherein a triangular pulse is used as pulse shape.

10. The method of claim 8, wherein the temporal distances between two successive zero crossings of the limiter signal are determined with a time accuracy and the processing signal is synthesized with a sampling rate that is less than a clock frequency.

11. The method of claim 10, wherein the temporal distance between two successive zero crossings of the limiter signal are detected.

12. The method of claim 8, wherein the value-and time-discrete processing signal is calculated in a manner dependent on the temporal distances between two zero crossings by an interpolation of the predetermined pulse shape at the support points determined by the sampling rate.

13. A converter circuit for processing an analog reception signal for a limiter receiver structure, comprising:

a limiter configured to convert the analog reception signal into a time-continuous, value-discrete limiter signal characterized by a sequence of rectangular pulses;

an evaluation circuit coupled to the limiter, wherein the evaluation circuit detects the temporal distances between two successive zero crossings of the limiter signal and outputs a zero crossing distance signal in response to the detection of the temporal distances; and a signal synthesis circuit receiving the zero crossing distance signal and generating a value- and time-discrete processing signal, wherein the zero crossings of the processing signal correspond to the zero crossings of the limiter signal and the pulse shape used for the signal synthesis has a smaller spectral width than a triangular pulse of corresponding width.

14. The converter circuit of claim 13, wherein the signal synthesis circuit has an interpolator that synthesizes the processing signal at support points determined by the sampling rate using the predetermined pulse shape.

* * * * *